J. C. NOLL.
WRENCH.
APPLICATION FILED MAY 25, 1910.
979,330.
Patented Dec. 20, 1910.
Fig. 1.
Fig. 3.
Fig. 2.
Fig. 4.
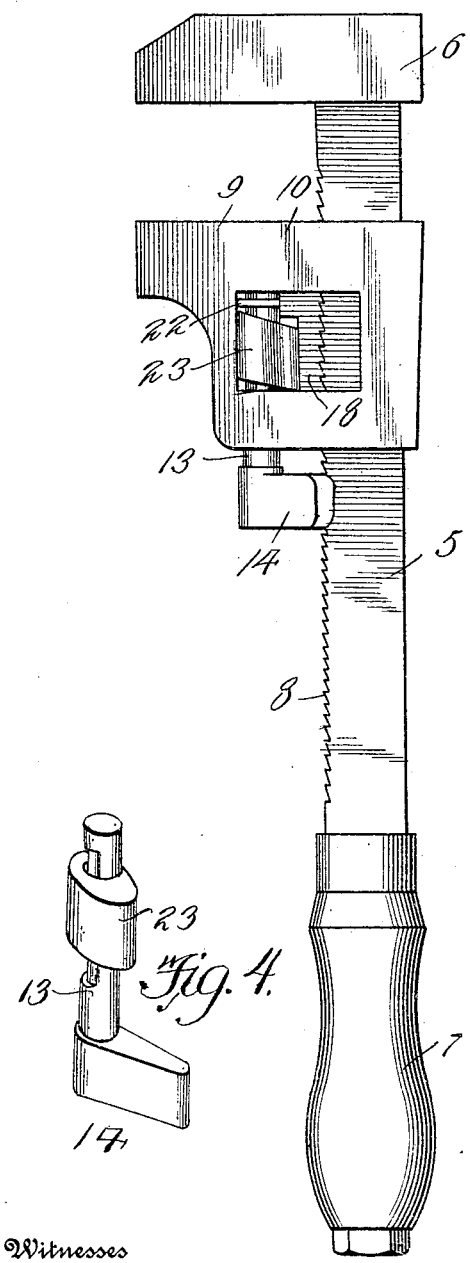
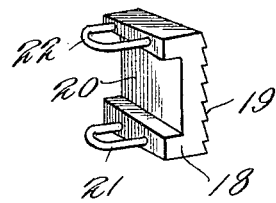
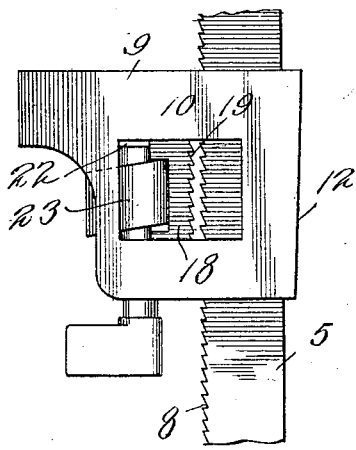
Witnesses
Frank B. Hoffman
K. Allen
Inventor
Joseph C. Noll
By Victor J. Evans
Attorney

UNITED STATES PATENT OFFICE.

JOSEPH CHARLES NOLL, OF FORT WAYNE, INDIANA.

WRENCH.

979,330.  Specification of Letters Patent.  Patented Dec. 20, 1910.

Application filed May 25, 1910. Serial No. 563,310.

*To all whom it may concern:*

Be it known that I, JOSEPH C. NOLL, a citizen of the United States of America, residing at Fort Wayne, in the county of Allen and State of Indiana, have invented new and useful Improvements in Wrenches, of which the following is a specification.

This invention relates to improvements in sliding jaw wrenches and has for one of its objects the provision of a sliding jaw wrench provided with a bodily movable dog adapted to engage with the shank of the wrench to hold the movable jaw in any of its adjusted positions.

Another object is the provision of a wrench having a serrated shank and a jaw slidingly fitted on said shank and provided with a dog and means connected with the dog adapted to bodily move the latter into and out of engagement with the serrated surface of the shank.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming part of the specification;—Figure 1 is a side elevation of the device. Fig. 2 is a detail side elevation of the sliding jaw and a portion of the shank showing the dog out of engagement with the shank. Fig. 3 is a detail perspective of the dog. Fig. 4 is a similar view of the member for actuating the dog.

Similar numerals of reference are employed to designate corresponding parts throughout.

The shank is designated by the numeral 5, the stationary jaw at one end of the shank by the numeral 6, and the handle at the opposite end of the shank by the numeral 7. The shank 5 is rectangular in cross section and is serrated on its inner surface as shown at 8.

The sliding jaw is designated by the numeral 9 and is provided with an opening for the loose reception of the shank 5. The said sliding jaw is further provided with a lateral recess communicating at its inner end with the opening for the shank. Extending parallel with the shank 5, and journaled in the opposite sides of the recess of the sliding jaw, is a shaft 13, one end of which extends beyond the inner end of said sliding jaw and is provided with a laterally extending handle 14. The portion of the shaft 13 between the opposite sides of the recess is substantially semi-circular in cross section for a purpose to be presently described.

A dog 18 is arranged within the recess, the said dog being formed of an oblong piece of metal. One face of the dog is serrated as shown at 19, to engage with the serrated surface 8 of the shank, and the opposite face of the dog is provided with a transverse channel 20, the opposite side walls of which are inclined. The dog 18 is positioned between the shaft 13 and serrated surface 8 of the shank 5 and connection between the dog and the opposite end portions of the shank is established by means of bails 21 and 22, which embrace the shank and have their opposite ends secured to the opposite sides and adjacent the opposite ends of the dog. The bails are of such dimensions that when the convex surface of the shank is facing the dog the substantially straight face of the shank will be spaced from the outer ends of the bail. When, however, the shaft is turned by means of the handle 14 the rounded surface of the said shaft will engage with the outer ends of the bails, thus moving the dog 18 outwardly and from engagement with the serrated surface of the shank.

In order that the dog may be moved into engagement with the serrated surface of the shank after the movable jaw has been properly adjusted the following construction is employed:

By reference now to the drawings it will be seen that positioned on that portion of the shaft 13 between the bails 21 and 22 is an eccentrically disposed head 23 corresponding in length to the space between the sides of the channel 20 and substantially elliptical in cross section. Owing to the shape of the head 23 and its disposition on the shaft 13 when the handle 14 is turned outwardly the short axis of the head will be at right angles to the floor of the channel. When, however, the handle is turned inwardly the long axis of the head will be at right angles to the floor of the channel, whereby the dog will be moved inwardly and its serrated surface engage with the serrated surface 8 of the shank 5, thus locking the movable jaw in adjusted position, as clearly shown in the drawings.

From the construction described it will be evident that the operator may properly adjust the movable jaw with the fingers of the hand holding the wrench and it will be further observed that the engagement between the serrated surfaces 8 and 9 is positive, so that when an object is engaged by the jaw members slipping of the movable jaw will be positively prevented during the operation of turning.

I claim:—

In a tool of the class described, the combination with a shank having a serrated surface and terminating at one end in a jaw member, a second jaw member slidingly fitted on the shank and provided with a lateral recess; of a shaft arranged parallel with the shank and having its end portions journaled in opposite sides of said recess, the medial portion of said shaft being semi-circular in cross section, a dog loosely fitted in the recess of the sliding jaw member and provided at its opposite ends with bails to embrace the semi-circular portion of the shaft, and a substantially elliptical-shaped head arranged on the central portion of the shaft to engage the dog, for the purpose described.

In testimony whereof I affix my signature in presence of two witnesses.

JOSEPH CHARLES NOLL.

Witnesses:
M. M. THORNBURG,
W. B. RUSHER.